W. I. ROGERS.
BODY OF MOTOR ROAD VEHICLES.
APPLICATION FILED JULY 2, 1919.

1,353,787.

Patented Sept. 21, 1920.

Inventor:-
William Ivey Rogers.
By:- B. Singer, Atty.

UNITED STATES PATENT OFFICE.

WILLIAM IVEY ROGERS, OF BIRMINGHAM, ENGLAND.

BODY OF MOTOR ROAD-VEHICLES.

1,353,787.　　　　　Specification of Letters Patent.　　Patented Sept. 21, 1920.

Application filed July 2, 1919. Serial No. 308,122.

*To all whom it may concern:*

Be it known that I, WILLIAM IVEY ROGERS, a subject of the Kingdom of Great Britain, residing at 2 Park Hill, Moseley, Birmingham, in the county of Warwick, England, engineer, have invented certain new and useful Improvements in or Relating to the Bodies of Motor Road-Vehicles, of which the following is a specification.

The present invention comprehends an attachment for a motor road vehicle or body thereof, having fore and rear seats, said attachment comprising a cover or section adapted to convert the rear seat of the car into a boot or rear extension.

The present invention further comprehends an attachment for a motor road vehicle or body thereof, comprising a substantially rigid cover or cover section adapted to be applied to cover the rear seat without necessitating the displacement of the latter, and in which the said cover or cover section is entirely separable from the vehicle or body.

In order that this invention may be clearly understood and readily carried into practice, reference may be had to the appended explanatory sheet of drawings, upon which:—

Figure 1:
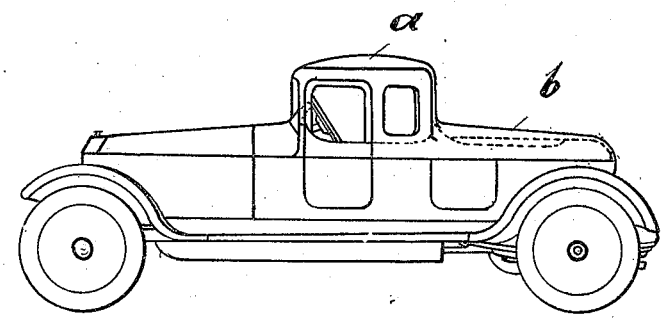
Figure 1 illustrates in side elevation an automobile with my invention applied thereto; the broken lines indicate the part of the car concealed by the device of the present invention.
Figure 2:
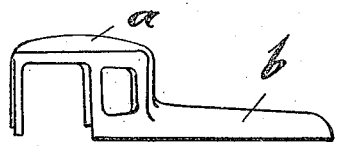
Fig. 2 illustrates separately the device according to the present invention, which is shown applied to the car illustrated in Fig. 1.

In a convenient embodiment of the present invention, I provide a coupé top *a* furnished with provision for accommodating a sliding window adapted to be raised, but which coupé top has a rigid rearward extension *b* so that when the coupé top is assembled upon the car body, the rear extension covers the rear seats of the car. This extension is adapted to effectively fit the rear part of the car body and to substantially conceal the juncture of the cover with the body.

The means for detachably connecting the extension or rear cover to the car body may be of any approved form, and are conveniently of a concealed or substantially concealed character.

What I claim as my invention and desire to secure by Letters Patent is:—

A demountable cover for a motor vehicle body having fore and rear seats, said cover being rigid and arranged to fit directly over the fore seat and to extend therefrom to the dash, and being also provided with a rear extension shaped to fit the rear part of the body and directly over the rear seat and form a boot.

In witness whereof I have hereunto set my hand.

WILLIAM IVEY ROGERS.